United States Patent [19]

Prenat

[11] Patent Number: 4,727,376
[45] Date of Patent: Feb. 23, 1988

[54] PROCESS FOR MEASURING THE AMBIGUOUS DISTANCE AND PULSE DOPPLER RADAR USING SUCH A PROCESS

[75] Inventor: Michel Prenat, Boulogne, France

[73] Assignee: Thomson-CSF, Paris, France

[21] Appl. No.: 561,830

[22] Filed: Dec. 13, 1983

[30] Foreign Application Priority Data

Dec. 17, 1982 [FR] France .................................. 82 21226

[51] Int. Cl.⁴ ............................................. G01S 13/10
[52] U.S. Cl. .................................................. 342/134
[58] Field of Search ........................ 343/13 R, 17.1 R; 342/134, 202

[56] References Cited

U.S. PATENT DOCUMENTS 3,798,643 3/1974 Blore et al. ...................... 342/109 X Primary Examiner—T. H. Tubbesing
Attorney, Agent, or Firm—Cushman, Darby & Cushman

[57] ABSTRACT

The present invention relates to a process for measuring the ambiguous distance in a pulse Doppler radar of repetition frequency ($f_R$).

The device comprises means (3) for transposing the signal received R(t) by a signal of frequency $p \cdot f_R$, where p is a positive integer; first and second narrow band filtering means (2,5) isolating the principal line of the signal received R(t) and of the transposed signal d(t) respectively, and means (6) for measuring the phase difference ($\Delta\phi$) which exists between the two filtered signals and which is proportional to the ambiguous distance with a coefficient g.

9 Claims, 5 Drawing Figures

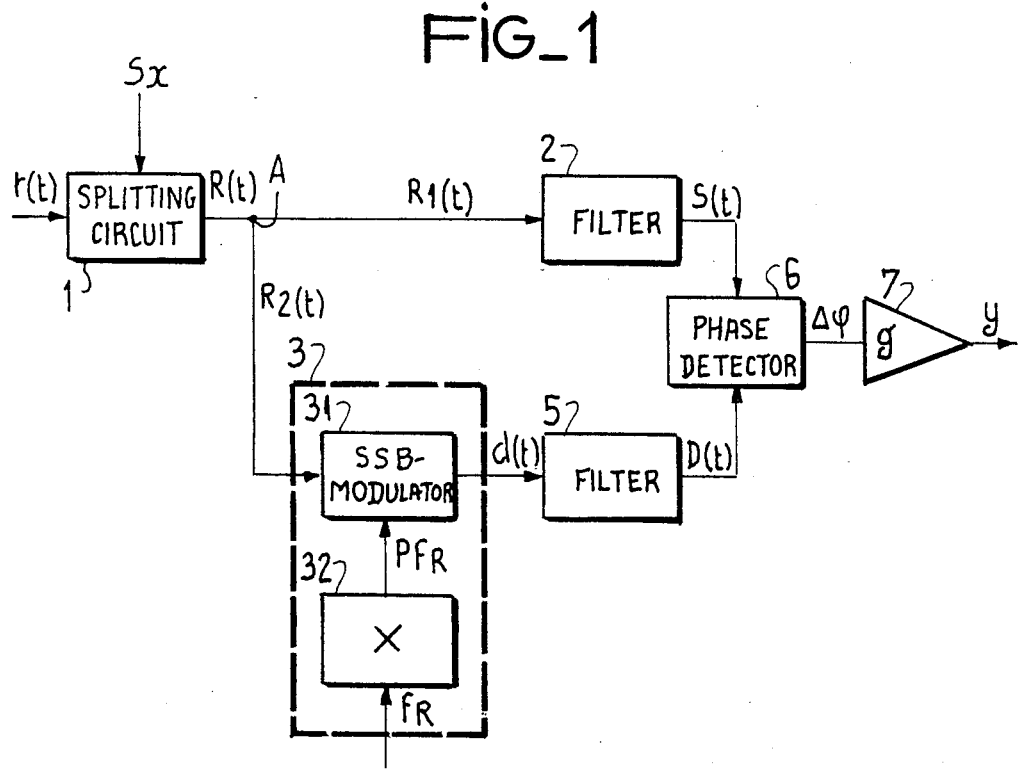
FIG_1
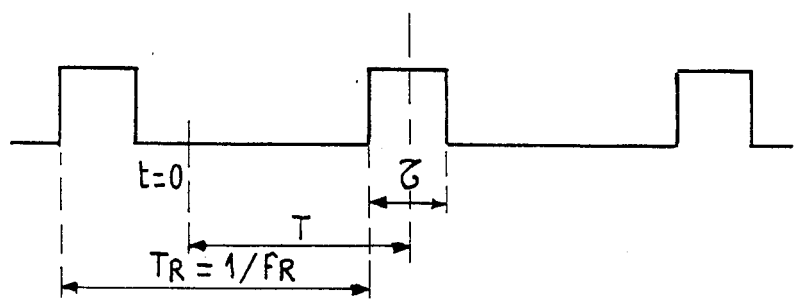
FIG_2

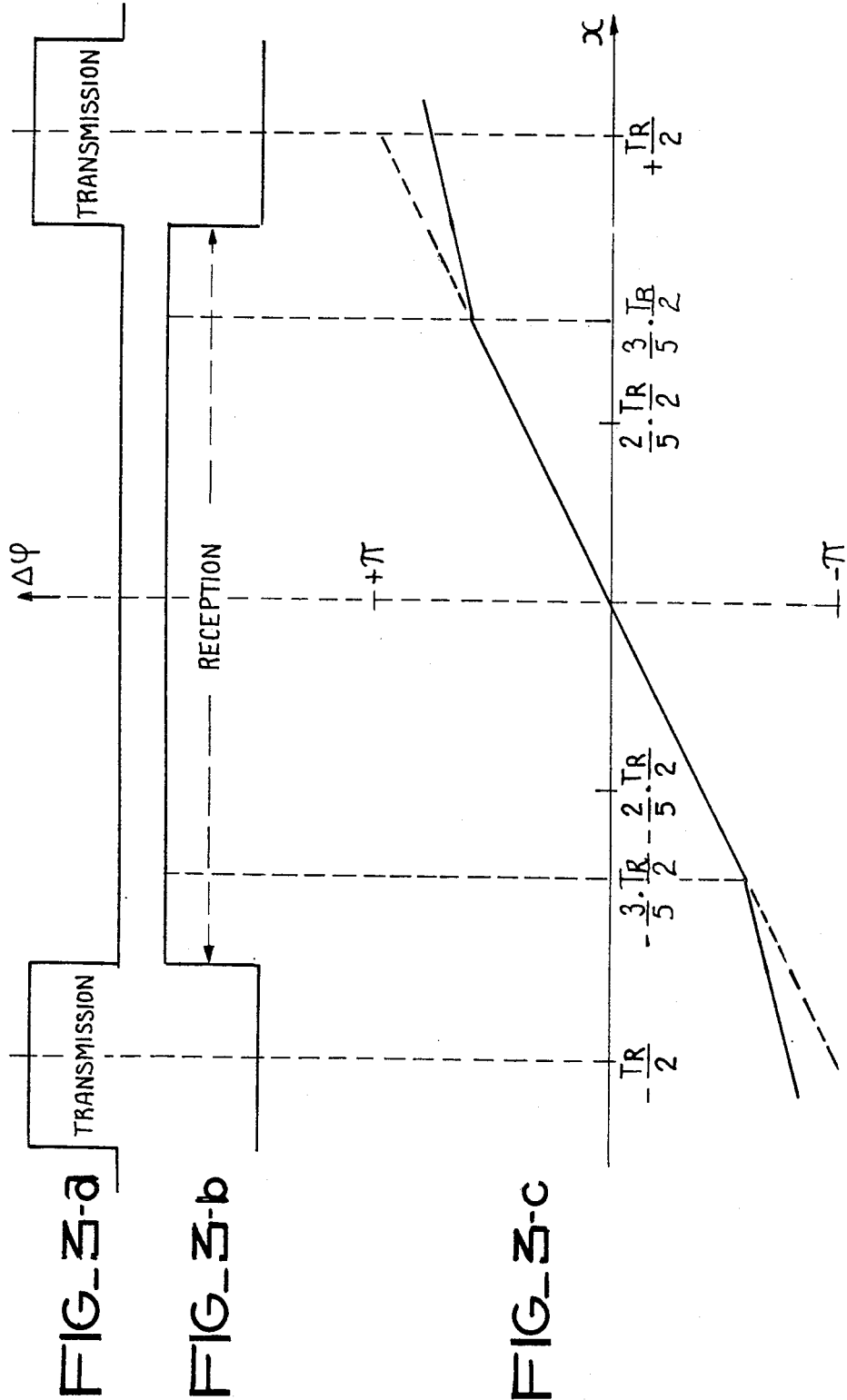

PROCESS FOR MEASURING THE AMBIGUOUS DISTANCE AND PULSE DOPPLER RADAR USING SUCH A PROCESS

BACKGROUND OF THE INVENTION

The present invention relates to a process for measuring the ambiguous distance and to a pulse Doppler radar using such a process.

In a Doppler radar transmitting pulses at a repetition frequency $f_R$ the spectrum of the signal transmitted is composed of a principal line at the carrier frequency $f_o$ and of side lines situated on either side of the carrier frequency $f_o$ at intervals equal to the repetition frequency $f_R$. Compared with the signal transmitted, the signal received has undergone a delay equal to the time taken for the signal transmitted to cover the radar-target-radar distance, and a frequency shift $f_d$ due to the Doppler effect. It therefore comprises a principal line at the frequency $f_o + f_d$ and side lines separated by $f_R$, the repetition frequency.

Some pulse Doppler radars have a distance ambiguity due to the fact that the delay on the signal received compared with the signal transmitted is only known with a modulo equal to the repetition period $T_R = 1/f_R$. This is the case in particular if the pulse repetition frequency is high. This distance ambiguity can be eliminated by changing the repetition frequency. During an interval of time when the repetition frequency is constant, the radar can only measure the ambiguous distance. The present invention provides a process for measuring the ambiguous distance.

A known process for carrying out this measurement consists in splitting the reception window into two split gates of the same width, and in calculating the ratio $$\frac{P_2 - P_1}{P_2 + P_1},$$

in which $P_1$ and $P_2$ are respectively the power of the output signal of the receiver corresponding to each of the two split gates.

This process has the following two disadvantages:
The characteristic obtained, (i.e. measurement of the ambiguous distance as a function of the ambiguous distance) is not linear around zero.
The characteristic is limited as soon as the absolute value of the ambiguous distance exceeds the product of the speed of light multiplied by a quarter of the width of the pulse transmitted (saturation effect).

The present invention makes it possible to overcome the above disavantages and relates to a process for measuring the ambiguous distance.

One advantage of the present invention is that it gives a linear characteristic of the measurement of the ambiguous distance as a function of the ambiguous distance.

Another advantage of the present invention is that it makes measurement of the ambiguous distance always possible when the pulse received is not totally eclipsed.

Another advantage of the present invention is that it makes it possible, in the case of a formation of several targets, to obtain a linear measurement of the ambiguous distance over the entire reception window, for each of the targets, with an transmission form factor of less than 0.5.

SUMMARY OF THE INVENTION

According to the process of the invention for measuring the ambiguous distance in a tracking Doppler radar transmitting pulses at the repetition frequency $f_R$ and receiving the signal reflected by the target in a reception window, the phase difference $\Delta\phi$ is measured which exists in the signal received between the principal line and a side line of order p after the latter and the principal line have been transposed to the same frequency and which corresponds to a measurement of the ambiguous distance.

BRIEF DESCRIPTION OF THE DRAWINGS

The present invention will be described in greater details with reference to the accompanying drawings, in which:

FIG. 1 shows the block diagram of part of a pulse Doppler radar measuring the ambiguous distance according to the process of the invention;

FIG. 2 shows the signal received after splitting of a reception window; and

FIGS. 3a to 3c show the characteristic of the measured ambiguous distance as a function of the position of the pulse received.

DESCRIPTION OF PREFERRED EMBODIMENTS

In the block diagram of FIG. 1, the radar operating in the tracking mode, r(t) denotes the signal reflected by the target (not shown) and received by the radar antenna (not shown), the signal transmitted by the radar being a pulse signal e(t) at the constant repetition frequency $f_R$.

In a non limiting analogical embodiment of the invention, the signal r(t) received by the antenna undergoes at first time splitting into a "sum" channel signal $R_1(t)$ and a "distance" channel signal $R_2(t)$ in a circuit 1 controlled by an external signal Sx. This circuit can be, for example, a switch. This splitting makes it possible to obtain a reception window which may or may not be adapted to the pulse transmitted, an adapted reception window being of the same width as the pulse transmitted and having an optimized signal-to-nose ratio.

As already mentioned and as will be shown later, the phase difference existing between the principal line and a side line of order p (situated, as mentioned above, at an interval equal to $pf_R$ from the principal line) represents the ambiguous distance of the target detected.

A phase difference can easily be measured between signals of the same frequency. Consequently, either the frequency of the side line of order p is transposed to the frequency of the principal line, as in the preferred non-limiting embodiment of FIG. 1, or conversely the frequency of the principal line is transposed to the frequency of the side line of order p.

This can be achieved by creating an auxiliary reception channel, called a "distance channel", in addition to the principal reception channel, called the "sum channel", the "sum" and "distance" channels being respectively fed with the signals $R_1(t)$ and $R_2(t)$ resulting from the division between the two channels, at point A, of the signal received and split R(t), and hence having the same frequency spectrum as the latter.

In the "distance channel", the spectrum of the signal received and split $R_2(t)$ is transposed by a frequency $pf_R$. One of the two side lines of order p has therefore been transposed to the original frequency $f_o + f_d$ of the principal line of the signal $R_2(t)$ and hence to the frequency of the principal line of the signal received $R_1(t)$ or $R(t)$.

This transposition of the spectrum of the signal $R_2(t)$ is effected by the sub-unit 3. In a non-limiting embodiment, this sub-unit can consist, an illustrated in FIG. 1, of a circuit 32 multiplying the repetition frequency $f_R$ by a positve integer p, and of a SSB-modulating circuit 31 which receives the signal of frequency $pf_R$ from the output of the multiplying circuit 32 and the signal $R_2(t)$ resulting from the division of the signal received and split $R(t)$ between the two "sum" and "distance" reception channels. The signal delivered by the transposing sub-unit 3 is denoted by $d(t)$.

The principal line of the signal $R_1(t)$, and hence of the signal received $r(t)$, and the transposed side line of order p of the signal $R_2(t)$, and hence of the signal received $r(t)$, are at the same frequency and are respectively isolated by a narrow band filter denoted by reference numeral 2 for the "sum" channel and by reference numeral 5 for the "distance" channel. The filters 2 and 5 are identical and respectively deliver a signal $S(t)$ and a signal $D(t)$ at the same frequency $f_o+f_d$, in which $f_o$ is the carrier frequency of the signal transmitted and $f_d$ the Doppler frequency corresponding to the target detected.

The signals $S(t)$ and $D(t)$ obtained at the output of the "sum" and "distance" channels respectively are applied at the input of a circuit 6 which measures and delivers their phase difference $\Delta\phi$, representing the ambiguous distance. This circuit 6 is, for example, a phase detector.

This signal representative of the phase difference $\Delta\phi$ is then amplified in a circuit 7 with a gain equal to $$g' = \frac{c}{2\pi \cdot 2p \cdot f_R}$$

if the ambiguous distance is to be expressed in meters, and to $$g = \frac{1}{2\pi \cdot p \cdot f_R}$$

if the ambiguous distance is to be expressed in seconds. This will be explained below in the description.

In another embodiment (not shown), the two signals $S(t)$ and $D(t)$ can be digital coded signals. The phase difference $\Delta\phi$ between the two signals $S(t)$ and $D(t)$ is then calculated by the circuit 6 and subsequently multiplied by the factor g or g' to give directly a measurement of the ambiguous distance which can be used immediately in a subsequent digital processing device.

The device shown in FIG. 1 operates in the hereabovedescribed manner, reference also being made to FIG. 2, which shows the signal $R(t)$ received by the antenna after time splitting.

In FIG. 2, the signal shown is the signal received $R(t)$ after splitting of an adapted reception window by a pulse signal $S_x$ at repetition frequency $f_R$ and of pulse width $\tau$.

The instant corresponding to zero is chosen arbitrarily and the instant corresponding to the middle of one of the pulses forming the signal $R(t)$ is called T. As the signal $R(t)$ is periodic, it consists of lines at frequencies which are multiples of $f_R$.

Breaking it down into a Fourier series leads to the following representation:

$$R(t) = \sum_{k=-\infty}^{+\infty} Z_k \cdot e^{j2\pi k \cdot f_R t} \text{ with}$$

$$Z_k = \frac{\tau}{T_R} \cdot e^{-j2\pi k \cdot f_R T} \cdot \frac{\sin \pi k f_R \tau}{k \pi f_R \tau} \text{ and } T_R = \frac{1}{f_R}$$

In the device of FIG. 1, the filter 2 isolating the zero-frequency line of the signal $R(t)$ delivers the signal $S(t) = Z_o = \tau/T_R$.

In the second ("distance") channel of the device of FIG. 1, the SSB modulator 31 delivers the distance signal $d(t)$ formed by multiplication of the signal $R(t)$ by a signal of frequency $pf_R$ ($p \geq 1$, p being an integer). Breaking it down into a Fourier series therefore gives:

$$d(t) = R(t) \cdot e^{-j2\pi p \cdot f_R t} = \sum_{k=-\infty}^{+\infty} Z_k \cdot e^{j2\pi(k-p)f_R t}$$

The filtering circuit 5 isolates the principal zero-frequency line $$D(t) = Z_p = \frac{\tau}{T_R} \cdot e^{-j2\pi p \cdot f_R T} \cdot \frac{\sin p\pi f_R \tau}{p\pi f_R \tau}$$

The second channel, or "distance" channel, therefore isolates the lateral line of order p of the signal received, after transposition to the same frequency as the principal line.

In the above calculation, it has been assumed that the signal received has a carrier frequency equal to zero, which makes it possible not to take the microwave phase of the signal into account. However, it is to show that this does not prejudice the generalization of the calculation.

Representing the SSB modulator 31 by the formula $e^{-j2\pi p \cdot f_R t}$ fixes the instant called zero in FIG. 2 at the instant when the phase of the modulator 31 is zero, that is to say when the phase of the transposition signal (of frequency $pf_R$) is zero.

If, in the expression of $D(t)$, $\sin(p\pi \cdot f_R \tau)$ is positive that is to say if p is a positive integer between $(2a/b)$ and $(2a+1/b)$, a being a natural integer and $b = \tau/T_R$ the form factor of the pulse transmitted, the phase difference $\Delta\phi$ between $S(t)$ and $D(t)$ (which are at the same frequency) is equal to:

$$\Delta\phi = \phi[S(t)] - \phi[D(t)] = 0 - (-2\pi p \cdot f_R T) = 2\pi p \cdot f_R T.$$

If $\sin(p \cdot \pi \cdot f_R \tau)$ is negative that is to say if the positive integer p is between $(2a-1/b)$ and $(2a/b)$, the phase difference is given by $\Delta\phi = 2\pi p f_R T + \pi$.

The reasoning is identical in both cases of a positive sin and a negative sin and is indicated below in the case of a positive sin.

The phase difference is obtained in an analogical or digital way by the detector 6.

Generally speaking a phase is known to within $2\pi$. The ambiguity in the phase difference $\Delta\phi$ is therefore equal to $2\pi$ and the following equation can be written:

$$\Delta\phi = 2\pi p \cdot f_R T + q \cdot 2\pi$$

in which q is a relative integer.

The phase difference $\Delta\phi$ can also be expressed by $$\Delta \phi = 2\pi p \cdot f_R \left[ T + \frac{q}{p \cdot f_R} \right] \quad (1)$$

The ambiguity in T, i.e. the interval of time existing between the instant corresponding to the middle of the pulse processed and the instant zero (when the phase of the SSB-modulator 31 is 0), is therefore equal to ($1/p \cdot f_R$) or alternatively to $T_R/p$, $T_R = 1/f_R$ being the repetition period of the pulses transmitted. From expression (1), we therefore have $$T + \frac{q}{p \cdot f_R} = \frac{1}{2\pi p \cdot f_R} \cdot \Delta \phi$$

Multiplied by the coefficient $$g = \frac{1}{2\pi p \cdot f_R}$$

the phase difference $\Delta \phi$ is therefore the measurement in seconds of the interval T between the instant zero and the instant corresponding to the middle of the pulse processed, this interval being known with the ambiguity $T_R/P$. This measurement in seconds is also the time taken by the signal transmitted to travel twice the ambiguous distance sought.

Multiplied by the coefficient $$g = \frac{1}{2\pi p \cdot f_R},$$

the phase difference $\Delta \phi$ is therefore the measurement y in seconds of the ambiguous distance.

With the speed of light denoted by c, the measurement y of the ambiguous distance which is travelled during an interval of time $T' = T/2 = g/2 \cdot \Delta \phi$ is therefore equal to $$y = cT = \frac{c \cdot g}{2} \cdot \Delta \phi = g' \cdot \Delta \phi.$$

Multiplied by the coefficient $$g' = \frac{c \cdot g}{2} = \frac{c}{2\pi \cdot 2p \cdot f_R}$$

the phase difference $\Delta \phi$ is therefore the measurement y in meters of the ambiguous distance.

FIGS. 3a and 3b respectively show the pulse transmitted, in the case of a form factor of 1/5 and the reception window with a form factor of 4/5.

FIG. 3c shows the characteristic of the phase difference $\Delta \phi$ obtained in this case, the shift in the pulse received R(t) before splitting of the reception window by the circuit 1 being represented on the abscissa x.

It can be seen that for $|x| > 3/5 \times T_R/2$ the pulse is truncated by the splitting, and, consequently, the middle of the pulse processed cannot be confused with the middle of the pulse received. There is therefore a break in slope of the characteristic at its ends.

For $|x| \leq 3/5 \times T_R 2$, the characteristic is perfectly linear.

In general, the reception form factor is very similar to the transmission form factor, so that the signal-to-noise ratio is a maximum, and it is possible in most cases to take p=1, that is to say to use the first side line of the spectrum.

However, if the form factor is small and less than 0.5, only part of the characteristic can be used and the slope of the characteristic is slight.

To overcome this disadvantage, a harmonic of higher order p of $f_R$ is used in this case rather than the first side line of the spectrum (p=1), so as to multiply the slope of the characteristic by p, according to the explanations given above in the general case of processing of the side line of order p.

The present invention has the following advantages:

When estimating the non-ambiguous distance of a target from the successive measurements of the ambiguous distance which are obtained for various values of the repetition frequency, it is not necessary to correct the measurements by calculation, since the characteristic obtained is linear.

Furthermore, it is always possible to measure the ambiguous distance provided that the pulse is not totally eclipsed. In fact, when the pulse is partially eclipsed the slope of the characteristic is divided by two. As the resulting curve remains strictly monotonous, this effect can be compensated.

If a formation of several targets appears, their distances from the radar are not equal. To be able to process them simultaneously, it is then necessary to use a much wider reception window than the pulse transmitted with a form factor of less than 0.5. The device in FIG. 1 makes it possible, for each of the targets, to obtain a measurement of ambiguous distance which is linear over the whole reception window.

The present invention can be applied to the measurement of the ambiguous distances in a pulse Doppler radar having a high repetition frequency.

What is claimed is:

1. A process for measuring the ambiguous distance in a tracking Doppler radar transmitting pulses at a repetition frequency $f_R$, and receiving signals reflected by a target in a reception window, comprising successively:
    a first step of transposing to a same frequency the principal line and a side line of order p in the frequency spectrum of the received signal, p being a positive integer;
    a second step of measuring the phase difference between the transposed principal and side lines at the same frequency; and
    a third step of multiplying the phase difference measured by a coefficient for providing a measurement of the ambiguous distance corresponding to the target.

2. A process according to claim 1, wherein the phase difference is multiplied by coefficient $$g = \frac{1}{2\pi p \cdot f_R}$$

in order to express the ambiguous distance in seconds, or by coefficient $$g' = \frac{c}{2\pi \cdot 2p \cdot f_R},$$

where c is the speed of light, in order to express the ambiguous distance in meters.

3. A process according to claim 1, wherein the step of transposing the phase difference comprises the following operations carried out in succession:
- separating the received signal into first and second parallel processing channels;
- on the second processing channel, transposing the signal received by a signal of frequency $p \cdot f_R$;
- on the first and second processing channels, narrow band filtering in order to isolate the principal line of the untransposed signal received and of the transposed signal received, respectively;

the phase difference of both principal lines being proportional to the ambiguous distance.

4. A process according to claim 1, wherein the side line of order p is transposed to the frequency of the principal line of the signal received.

5. A process according to claim 1, wherein the frequency of the principal line of the signal received is transposed to the frequency of the side line of order p.

6. A Doppler radar transmitting pulses at a repetition frequency $f_R$ by means of an antenna and receiving, by means of the same antenna, the signal reflected by the target and split by a reception window, further comprising:
- means for transposing a side line of order p, p being a positive integer, and the principal line of the signal received to a same frequency,
- first and second narrow band filtering means for isolating respectively the principal line of the signals which are delivered by the transposing means, and with which they are respectively supplied;
- means for measuring the phase difference existing between the signals at the same frequency delivered by the first and second filtering means and delivering a signal ($\Delta \phi$) whose amplitude is proportional to the ambiguous distance of the target.

7. A pulse Doppler radar according to claim 6, wherein it further comprises means for multiplying the output signal of the measuring means by a coefficient $$g = \frac{1}{2\pi p \cdot f_R}$$

and delivering a measurement in seconds of the ambiguous distance of the target.

8. A pulse Doppler radar according to claim 6, wherein the transposing means comprises:
- a circuit for multiplying the repetition frequency ($f_R$) of the transmitted pulses by a factor p, p being an integer greater than or equal to 1; and
- a single-side-band modulator receiving at a first input, the signal received and at a second input the pulse signal of repetition frequency ($p \cdot f_R$) from the output of the multiplying circuit.

9. A pulse Doppler radar according to claim 6, wherein the measuring means consists of a phase detector.

* * * * *